April 3, 1973     S. R. JOHNSON ET AL     3,725,004
GEL DIFFUSION DEVICE
Filed Dec. 21, 1970     3 Sheets-Sheet 1
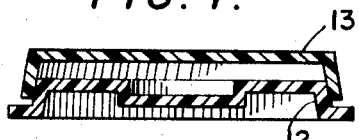
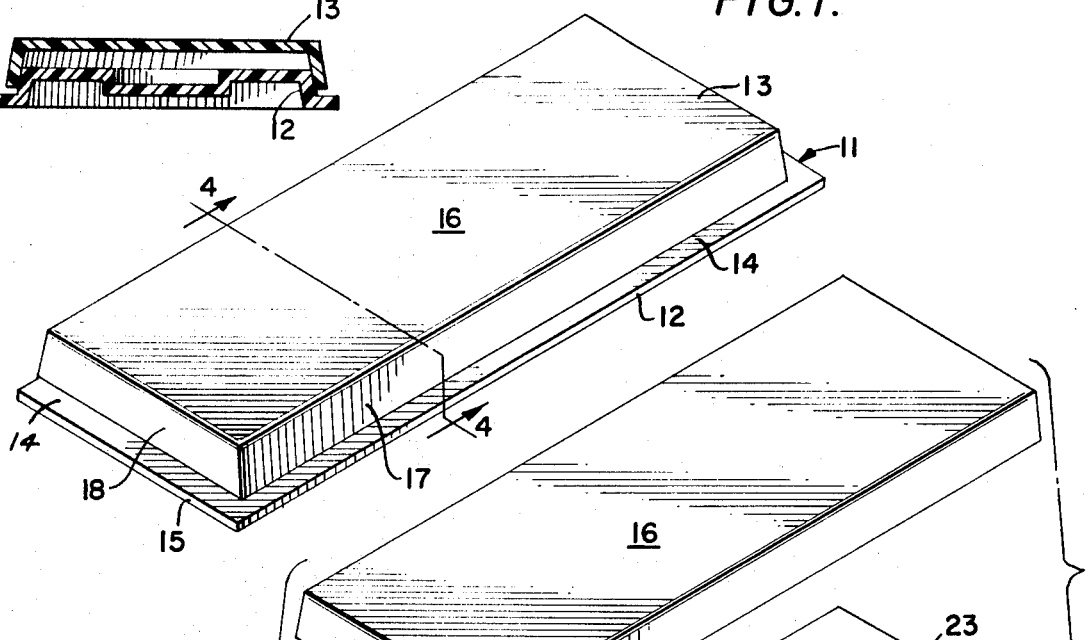
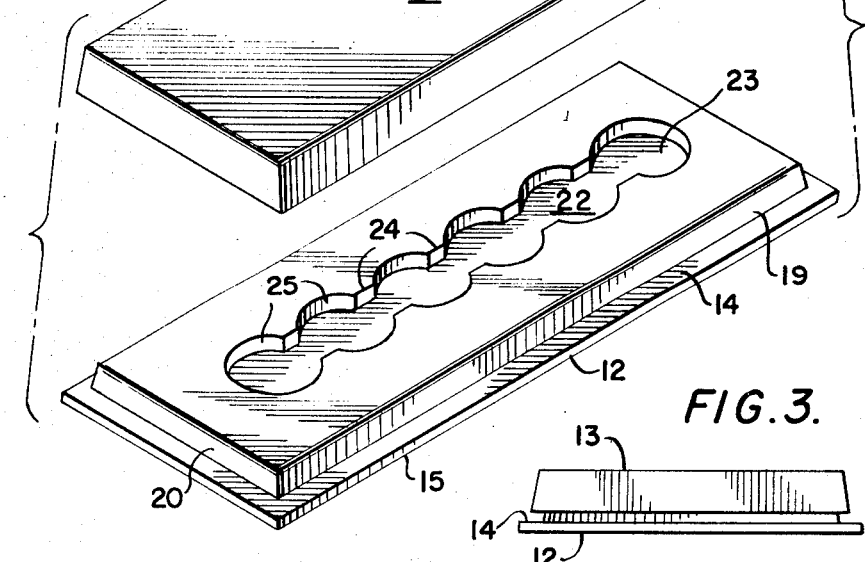
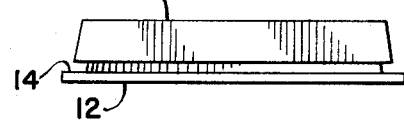
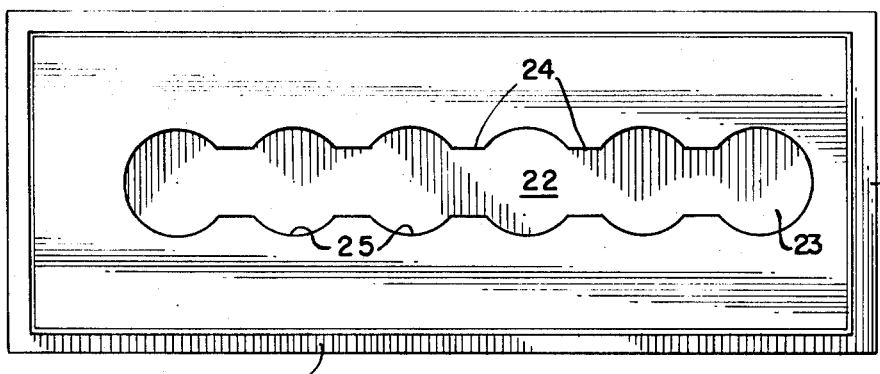
INVENTORS
STANLEY R. JOHNSON &
SHELDON H. FOREL
BY Scott J. Meyer
ATTORNEY April 3, 1973    S. R. JOHNSON ET AL    3,725,004
GEL DIFFUSION DEVICE Filed Dec. 21, 1970    3 Sheets-Sheet 2

INVENTORS
STANLEY R. JOHNSON &
SHELDON H. FOREL

BY Scott J. Meyer
ATTORNEY

April 3, 1973　　S. R. JOHNSON ET AL　　3,725,004
GEL DIFFUSION DEVICE

Filed Dec. 21, 1970　　3 Sheets-Sheet 3

INVENTORS
STANLEY R. JOHNSON &
SHELDON H. FOREL

BY *Scott J. Meyer*
ATTORNEY

United States Patent Office 3,725,004
Patented Apr. 3, 1973

3,725,004
GEL DIFFUSION DEVICE
Stanley R. Johnson, Fountain Valley, and Sheldon H. Forel, Redondo Beach, Calif., assignors to Baxter Laboratories, Inc., Morton Grove, Ill.
Filed Dec. 21, 1970, Ser. No. 99,797
Int. Cl. C12k 1/04; G01n 31/02, 33/16
U.S. Cl. 23—230 B                        16 Claims

ABSTRACT OF THE DISCLOSURE

A shallow receptacle having at least one recess therein for holding a gel medium for performing biochemical determinations by a technique known as radial gel diffusion. The sidewalls of the recess possess arcuate indentations to provide a series of bay-like areas. The shallow receptacle is provided with a cover which has a top that is displaced from the top surface of the shallow receptacle when the cover is placed over the shallow receptacle.

BACKGROUND OF THE INVENTION

In recent years, a valuable analytical technique known as gel diffusion has been developed for the quantitation of various constituents of biological fluids such as blood serum, plasma, urine and cerebrospinal fluid. In particular, a gel diffusion technique referred to as radial immunodiffusion involves a single-diffusion type of precipitin reaction in which one of the participants of the reaction is incorporated in a solidified gel medium whereas the other reactant is introduced into a well from which it is allowed to diffuse into the gel.

Single radial immunodiffusion was probably first employed by Petri in his studies on the growth of bacterial colonies on gelled media containing specific antisera. Brit. J. Expt'l Path. 13,380 (1932). The radial immunodiffusion technique was further developed by other scientists and, in particular, by Mancini, who contributed significantly to this technique with kinetic studies of the system. Immunochemistry 2, 235–254 (1965).

In a practical embodiment of radial gel diffusion, a biochemically active substance, e.g. antiserum, is dispersed in a liquid gelling agent, e.g. molten agar, which is distributed into a shallow receptacle or plate and allowed to solidify. When a biochemical determination is to be performed, the surface of the solidified gel is punched at approximately equidistantly spaced intervals to provide small cylindrical holes or wells. The biological fluid to be tested, e.g. a body fluid such as blood serum, is then introduced into the well such as by pipetting. The receptacle is then set aside or incubated for a given period of time, usually in a conventional humid box. At a selected time, the surface of the gel is examined. The resultant is an annular area about each well into which the sera or other body fluids have migrated. The sera or other body fluids will undergo a degree of interaction with the antibodies in the gel to form a circular area of discernible precipitate. The area of precipitation as measured against a developed scale will provide a quantitative determination with respect to the specific test being conducted.

This type of immunochemical testing procedure is particularly useful in identifying the following blood proteins quantitatively: Human IgG, IgM, IgA, IgD, IgE, transferin, ceruloplasmin, $\alpha_2$-macroglobulin, complement C3 ($\beta_1$-C/$\beta_1$-A globulin), albumin, prealbumin, hemopexin, fibrinogen, $\alpha_1$-acid-glycoprotein (orosomucoid), $\alpha_1$-antitrypsin, haptoglobin, $\alpha_2$-HS-glycoprotein, $\beta_1$-lipoprotein, $\beta_2$-glycoprotein, and C-reactive protein.

In view of the fact that the antisera or antibodies utilized in the gel are relatively expensive, attempts have been made to employ as small an area as possible consistent with obtaining good results. In Clin. Chim. Acta 21, 517–520 (1968), the authors Lopez and Golder call for application of antibody material to the gel in small agar discs. Antigen which is placed in a central well in each disc is permitted to diffuse through the agar to form concentric ring precipitates. This device is difficult to fabricate because of the requirement for separate discs and is not easy to fill with consistency and accuracy due to the separate gel and antisera pourings required for each of the individual discs.

In another attempt at economy, a shallow receptacle has been limited to a one inch by three inch configuration. In such a device it has been found that six equidistantly spaced wells for antigen can be positioned without causing overlap in the concentrically produced precipitated areas. Such a device is illustrated in a report by Lou and Shanbrom, J. Amer. Med. Ass'n. 200, page 323 (1967).

Finally, as yet another valiant attempt at achieving economy, the receptacle has been modified with barrier walls so that the area containing the agar is scaled down to an area of one-half inch by three inches. However, such a small area, with six wells, does not produce competent results. In this arrangement, the barriers constitute longitudinal side walls which are parallel and only one-half inch apart. This relatively small distance causes a concave meniscus of the agar gel and a relative dehydration therein to distort the results of the diffusion test by drawing the antigen into noncircular patterns.

In summary of the prior art, small area receptacles employed heretofore for radial gel diffusion have generally produced distorted diffusion zones and invalid test results or have been impractical to fabricate and use in commercial applications. Small surfaces of gel, when confined by linear or straight edges, whether external or internal barriers, encountered the following problems:

(1) If the wells are too close together, the reaction zones interact, thereby inhibiting the formation of round precipitin zones.
(2) If the wells are further apart but closer to the edges of the receptacle or plate, the following occurs: As the zones approach the edges of the plate, the rings are drawn toward the barrier until the zones of precipitation become either tangent to the barrier (or edge) or become peaked or squared at the points on the rings which are closest to the barrier or edge).

SUMMARY OF THE INVENTION

In the foregoing, the thrust of the problem has been unearthed, that is, utilization of as small a quantity of gel and the biochemically active component therein as possible consistent with excellent results. In regard thereto, the invention is to a shallow receptacle for performing a plurality of radial gel diffusion tests. The longitudinal side walls of that portion of the receptacle confining the gel describe a series of arcs. Each side wall is a mirror image of the other side wall. The shallow receptacle has a nesting cover.

DETAILED DESCRIPTION OF THE INVENTION

In order to fully understand and appreciate the meritoriousness of the contribution residing in the invention, attention is directed to the drawings wherein the same reference numerals throughout refer to identical parts:

FIG. 1 is a top perspective view of the gel diffusion device with the top closure in position.

FIG. 2 is the same view as in FIG. 1 with the top closure exploded from the shallow receptacle.

FIG. 3 is an end view of the gel diffusion device with the top closure in place.

FIG. 4 is a cross-sectional view taken along lines 4—4 of FIG. 1.

FIG. 5 is a top plan view of the shallow receptable.

Figure 6:
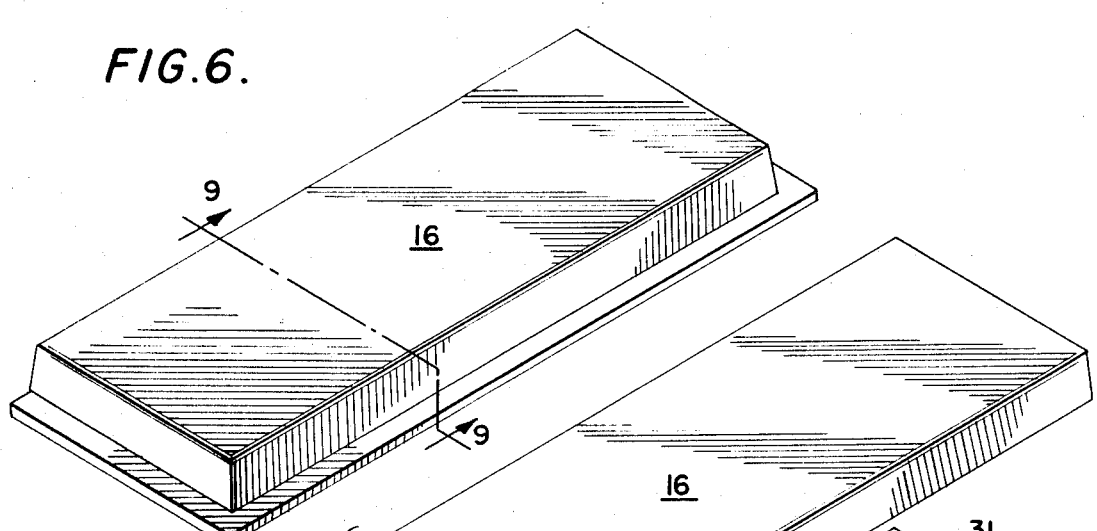
FIG. 6 is a top perspective view of another embodiment of the gel diffusion device with the top closure in position.
Figure 7:
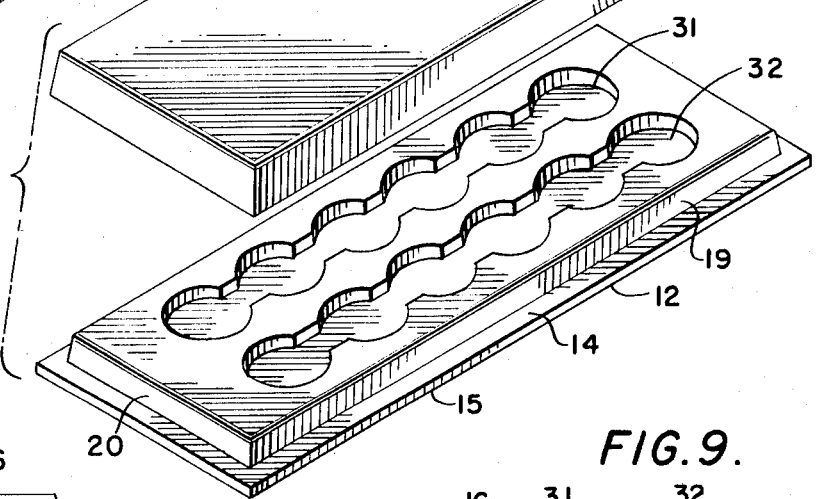
FIG. 7 is the same view as in FIG. 6 with the top closure exploded from this embodiment of the shallow receptacle.
Figure 8:
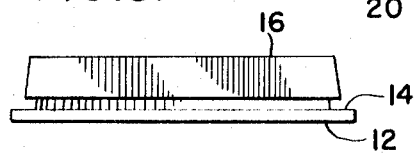
FIG. 8 is an end view of this embodiment.
Figure 9:
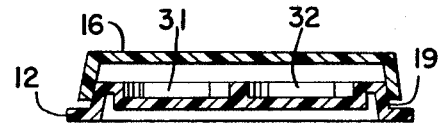
FIG. 9 is a cross-sectional view taken along lines 9—9 of FIG. 6.
Figure 10:
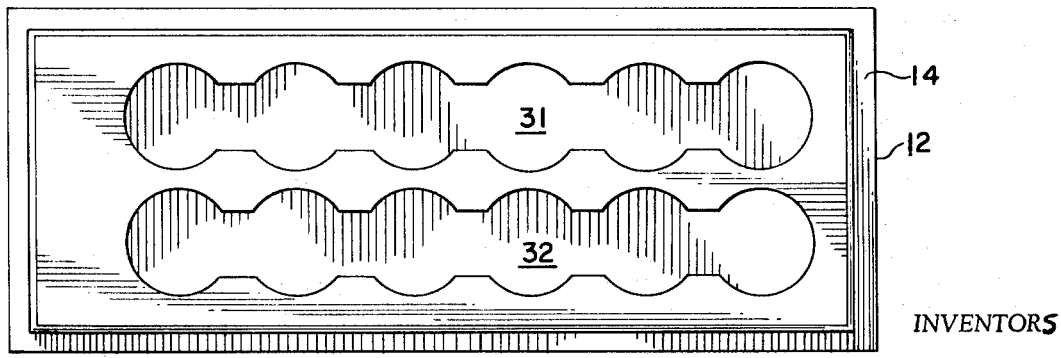
FIG. 10 is a top plan view of this embodiment.

Attention is directed to FIG. 1 for a view of the gel diffusion device 11 of the present invention. A portion of the shallow receptacle 12 can be seen protruding from under the top closure 13. The gel diffusion device in this instance, it will be noted, has a generally rectangular configuration with a relatively overall low vertical height. From FIG. 2 one can discern a clearer view of the shallow receptacle 12 which presents a rectangular slab configuration and has a major portion offset on a plurality of sides to provide a soulder 14 on each such side. As seen, the horizontally leading edges 15 of the shallow receptacle extend beyond the top closure 13.

The top closure 13 comprises a relatively flat uppermost portion 16. This flat uppermost portion 16 has downwardly and outwardly flaring sidewalls 17 and, similarly, end walls 18. The upwardly ending sidewalls 19 and end walls 20 of the shallow receptable 12 slope inwardly. The inner cross-sectional dimensions of the top closure are larger than the cross-sectional dimensions along the top of the shallow receptacle 12 but smaller than the cross-sectional dimensions somewhat below said top of the shallow receptacle. These dimensions make it possible for the top closure to nest on the respective ends and sidewalls of the shallow receptacle. By utilizing a top closure with end and sidewalls of sufficient height, the underside of the flat uppermost portion 16 does not rest on the surface 21 of the shallow receptacle but is suitably vertically displaced therefrom. FIG. 3, by depicting an end view, shows the manner of nesting relationship achieved between the top closure and the shallow receptacle. The cross-sectional view of FIG. 4 further emphasizes this view. It will be seen from FIGS. 3 and 4 that the downwardly depending edges of the top closure do not abut the upper surface of the shoulder 14.

The shallow receptable 12, as can be seen from FIGS. 2 and 5, has an elongated recess 23 with a bottom 22. The sidewalls 24 of the recess possess a plurality of spaced arcuate indentations 25. The arcuate indentations of one sidewall are directly opposite the arcuate indentations of the other sidewall. The arcs formed by the opposed indentations each define about quarter segments of an imaginery circle. The recess gives the appearance, therefore, that it is the result of removal of the intervening portions between a plurality of circular recesses so that now all of the recesses are in communication with each other. An important advantage of this arrangement is that it provides for the introduction of liquid gelling material anywhere in the recess 23. The gelling material being fluid will then flow into the other portions or bays of the recess 23, thereby avoiding the necessity of introducing the gelling material into individual testing zones.

The material for fabricating the gel diffusion device of the present invention can be a plastic such as a rigid transparent or translucent plastic. In such an instance, the top closure 13 and the shallow receptacle 12 can be produced by injection molding techniques. From FIG. 4 it will be seen that the shallow receptacle is undercut along the bottom thereof. By using transparent material, the degree of diffusion, during the course of employing the test, can be easily ascertained through the bottom as well as through the top without the necessity of removing the top closure 13.

Suitable transparent plastics for fabricating the gel diffusion device of this invention are, for example, polystyrene, polycarbonate, polyethylene, methyl methacrylate or "TPX" (methyl pentene polymer).

Attention is now directed to FIGS. 6–10. These figures correspond to FIGS. 1–5, respectively, discussed with great particularity in the above. FIGS. 6–10 depict another embodiment. However, it will be seen that this modification relates primarily to the provision of two parallel recesses 31 and 32, each having a configuration similar to recess 23 of the above. In this embodiment, it may be convenient to provide a somewhat larger shallow receptacle to accommodate the two recesses. As this embodiment is essentially the same in other respects as the first embodiment, it does not appear to be necessary to describe the parts as before.

Figure 11:
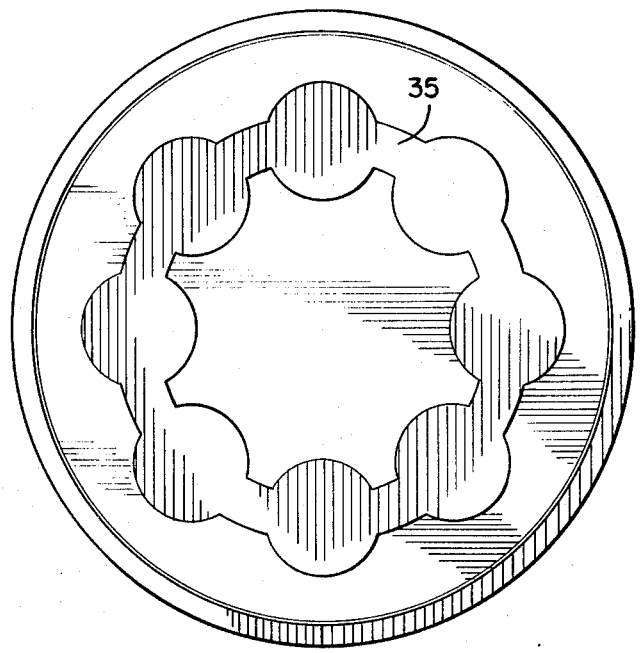
FIG. 11 is a top plan view of the shallow receptacle of yet another embodiment.
Figure 12:
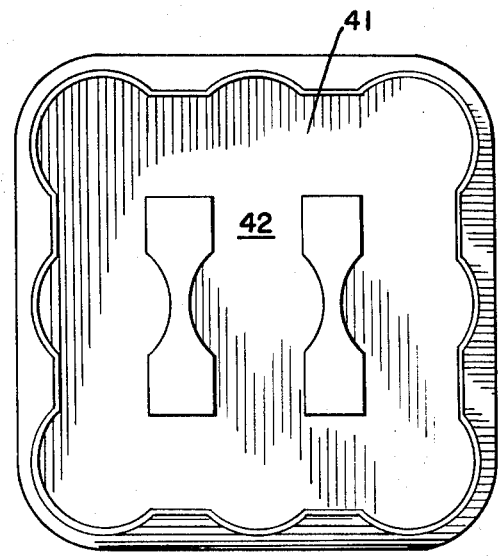
FIG. 12 is a top plain view of the shallow receptacle of still another embodiment.

FIG. 11 is a top plan view of another embodiment where the shallow receptacle has a circular configuration and the recess 35 with the walls having arcuate indentations is annular in nature. Of course, with this embodiment the top closure generally will be circular. In still another embodiment as shown in FIG. 12, the recess 41 has a square configuration with a cross leg 42. In this embodiment, the entire device generally will be of a square shape as will be the top closure. From the foregoing it will become apparent that the recesses for containing the gel medium can be arranged in a number of rows and have a further variety of configurations.

The advantage of the embodiments shown in FIGS. 6–12 is that, on the same plate, combinations of individual recesses allow different tests to be performed at different times without infiltration of earlier reaction zones into the unused portion of the gel on the plate. Thus, if the recesses are arranged in rows on a plate as in FIGS. 6–10, there can be no interaction between rows of wells because each series of wells is confined within its recess. Similarly, if the recess is arranged in a circular configuration on a plate as in FIG. 11, there can be no interaction across the circle. By way of comparison, in prior art plates containing a multiplicity of wells, for example, 24 wells on a single gel surface, after several of the wells have been used, a few of the remaining unused wells are usually lost to further use because of interaction with the used wells.

In use, the area or bay described by a set of opposing arcuate indentations is punched to produce a single well per bay. It is contemplated within the purview of the invention that the dimensions are selected whereby the area of each bay is from about 0.17 to about 0.18 and preferably about 0.177 square inch. A bay having a diameter of about 12 mm. is eminently suitable. Due to the unique utilization of the arcuate indentations of the sidewalls of the recess, the gel diffusion device having the aforesaid area per bay is capable of performing accurate adult protein determinations which heretofore required surface areas of gel medium, ranging from about 0.250 to about 0.600 square inch per well.

The gel diffusion zone is determined by the activity and amount of antigen, antibody or other biochemically active substance contained in the gel and the concentration of the corresponding reactant substance contained in the sample in the well. The accepted conventional technology requires that specificities of the antigen- or antibody-containing gel produce diffusion rings of not less than about 3.0 mm. in diameter because smaller zones are not sufficiently sensitive for accurate quantitative results. This requirement is based on the use of a standard well size of about 2.5 mm. in diameter, which leaves a radius of at least about 0.25 mm. on each side of the well with a minimum diffusion ring of 3.0 mm. in diameter encircling the well. Preferably, the gel diffusion zone diameters range from about 3.5 to about 9.0 mm. in order to provide the desired sensitivity and precision of quantitation.

Another dimension of interest is the depth of the recess 23, for instance, which is from about 2 to about 3 and preferably about 2.5 mm. deep, as stated, being rather shallow. Generally, the recess as represented by FIGS. 1–5, for example, will have a volume of from about 1.4 to about 1.6 ml. When the two row embodiment of FIGS. 6–10 is utilized, the total volume is of the order of from about 2.8 to about 3.2 ml. In a shallow receptacle having external measurements of about 1.50 by 3.75 inches, two rows of recesses can in fact be accommodated. With the type of dimensions mentioned, six bays or zones are generally provided when a single recess is utilized while twelve bays are provided with two recesses.

In practice, each recess of the receptacle preferably contains at least four bays, of which three will generally be used for control samples of three different levels of activity and one or more will be used for the unknown sample.

In the preparation of the gel medium, any conventional gelling agent can be used, for example, gelatin, pectin, silica gel, starch, polysaccharides from seaweed such as agar, algin and carrageenin, purified agarose as prepared, for example, by methods described in U.S. Pats. 3,281,409, 3,335,127 and 3,362,884, synthetic polymeric gelling agents such as the cross-linked polyacrylamide disclosed in U.S. Pat. 3,046,201, the modified cellulose disclosed in U.S. Pat. 3,360,440, and the like materials.

The gel material can contain minor amounts of various additives such as, for example, buffer materials, preservatives, protective agents, electrolytes, surfactants, and the like substances, depending in part upon the specific test to be employed with the gel diffusion device of this invention.

It will be appreciated that the use of the herein-defined gel diffusion device is not limited to any specific radial diffusion test, it being understood that any and all such tests can be employed. The device can be utilized, for example, for the quantitation of small concentrations of antigens, antibodies, enzymes, hormones, proteins, steroids, products of carbohydrate, protein and lipid metabolism, antibotics and other medicinals and drugs administered for the treatment of disease, and the like components of biological fluids such as blood serum, plasma, urine and cerebrospinal fluid.

Illustrative of the radial diffusion tests to which the device is adapted are tests for hormones such as HCG as described in U.S. Pat. 3,171,783, tests for DPNH-linked enzymes such as LDH as described in co-pending application Ser. No. 693,095, filed Dec. 26, 1967, and now abandoned and hydrolytic enzymes such as amylase as described in co-pending application Ser. No. 55,972 filed July 17, 1970, and now abandoned, tests for blood coagulation components such as plasmin and plasminogen as described in co-pending application Ser. No. 764,628, filed Oct. 2, 1968, and thrombin as described in co-pending application Ser. No. 764,627, filed Oct. 2, 1968, and tests for complement fixation antibodies as described in co-pending application Ser. No. 848,338, filed Aug. 7, 1969.

While there have been shown and described particular embodiments of the invention, it will be obvious to those skilled in the art that various changes and modifications may be made therein without departing from the invention, and, therefore, it is aimed to cover all such changes and modifications as fall within the true spirit and scope of the invention.

What is claimed is:
1. A device for conducting radial gel diffusion type tests comprising a receptacle, said receptacle having at least one recess along the upper surface thereof with essentially non-sloping side walls, said recess having arcuate indentations along each side wall thereof, said arcuate indentations of one side wall being opposite the arcuate indentations of the other side wall to thereby define a plurality of generally circular bays each interconnected with at least one other bay by restricted portions in said recess.

2. The device of claim 1 wherein the uppermost surface of the receptacle is relatively uninterrupted except for said recess.

3. The device of claim 2 wherein the recess is elongated.

4. The device of claim 2 wherein the recess is annular in configuration.

5. The device of claim 2 wherein the recess has a square configuration.

6. The device of claim 1 wherein the receptacle has outwardly extending walls and wherein said walls slope inwardly from the bottom thereof.

7. The device of claim 6 wherein the device includes a cover, said cover describing a top portion and depending sidewalls, said sidewalls flaring outwardly, said sidewalls adapted to nest on said sloping walls of said receptacle and having dimensions whereby the underside of the top portion of the cover is in spaced relationship with said upper surface of the receptacle.

8. The device of claim 7 wherein the receptacle has a flange extending outwardly from substantially the bottom of the sidewalls of the receptacle.

9. The device of claim 8 wherein the material of construction for the receptacle and cover is plastic.

10. The device of claim 9 wherein the plastic for at least the cover is transparent.

11. The device of claim 7 wherein the recess is filled with a gel medium.

12. The device of claim 11 wherein the gel medium is selected from the group consisting of agar, agarose, gelatin and pectin.

13. The device of claim 12 wherein the gel in each bay has a small well located centrally with respect thereto.

14. The device of claim 11 wherein the surface area of the gel medium is from about 0.17 to about 0.18 square inch per bay.

15. The device of claim 14 wherein the depth of the said recess is from about 2 to about 3 mm.

16. In the method of conducting radial gel diffusion tests on a series of biological samples, the improvement comprising contacting said samples with a gel containing an appropriate biochemically active reactant for said biological samples by diffusion from a series of wells punched in the surface of said gel, said gel being contained in at least one recess with essentially non-sloping side walls on the upper surface of a receptacle, said recess having arcuate indentations along each side wall thereof, said arcuate indentations of one side wall being opposite the arcuate indentations of the other side wall to thereby define a plurality of generally circular bays each interconnected with at least one other bay by restricted portions in said recess.

References Cited
UNITED STATES PATENTS

| | | | |
|---|---|---|---|
| 3,432,275 | 3/1969 | Unger | 23—292 |
| 3,480,400 | 11/1969 | Csizmas et al. | 23—259 |

MORRIS O. WOLK, Primary Examiner

R. M. REESE, Assistant Examiner

U.S. Cl. X.R.

23—253 R, 259, 292; 195—103.5 R